Aug. 7, 1956  E. E. CLINE  2,757,897
VALVES

Filed Feb. 14, 1952  2 Sheets-Sheet 1

INVENTOR:
Earl E. Cline,
BY Cushman, Darby & Cushman
ATTORNEYS.

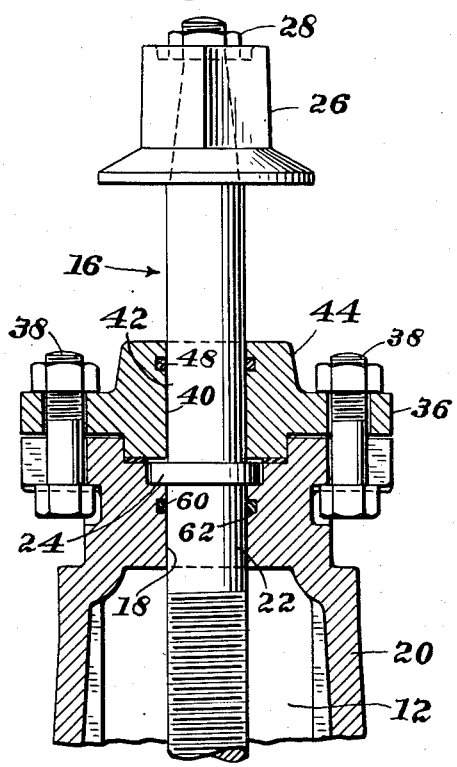
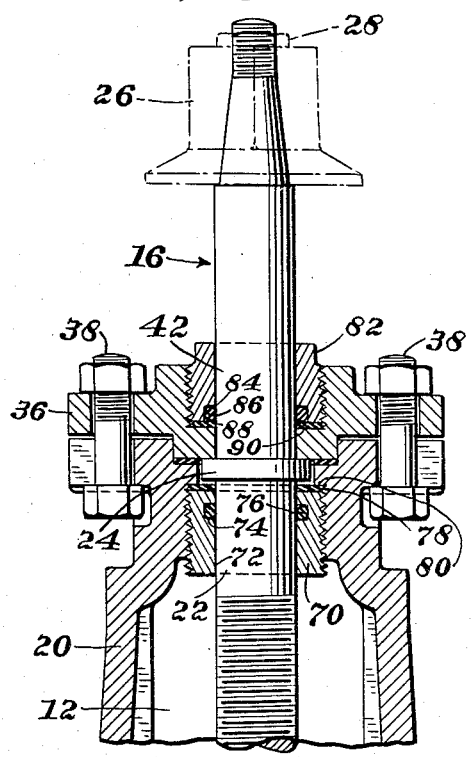
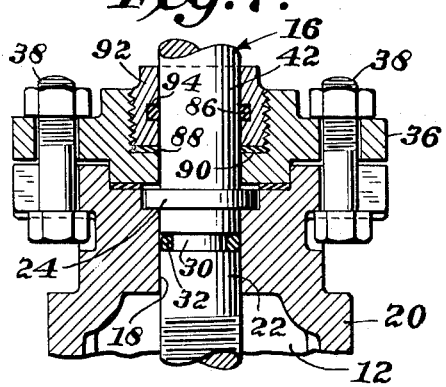
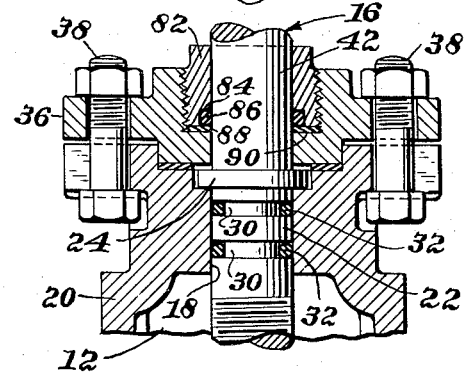
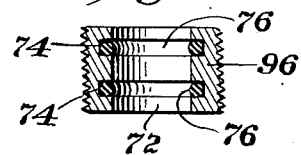

United States Patent Office 2,757,897
Patented Aug. 7, 1956

2,757,897
VALVES

Earl E. Cline, Chattanooga, Tenn., assignor to Mueller Co., Decatur, Ill., a corporation of Illinois Application February 14, 1952, Serial No. 271,607

4 Claims. (Cl. 251—266)

The present invention relates to improvements in valves of the non-rising stem type. The invention is disclosed as applied to a particular gate valve of this general classification, but it will be understood that the benefits of the improvements disclosed herein are not limited to that particular type of valve. This application is a continuation-in-part of my copending application Serial No. 779,664, filed October 14, 1947, now abandoned.

Valve stems of the non-rising type present a difficult problem with respect to the maintaining of a seal around a valve stem, which is sufficiently permanent in character. Oftentimes, such valves are installed in isolated places where little or no inspection or maintenance is possible. Valve stems of the non-rising type are provided with an abutment flange which is usually subjected to thrust forces of considerable magnitude in opening and closing the valve. This is particularly true in the case of valves positioned in pressure lines at isolated points, which may not be opened except on rare occasions. The above difficulties are also present in the case of gate valves which are designed to control relatively high pressures in a line, such as valves of the type shown in the drawings herein, having a valve gate comprising a pair of plates which are automatically wedged into their closed position. Obviously, considerable force is required in opening such a valve, and such force includes a thrust against the flange or collar on the valve stem particularly referred to. Relatively great forces are present in the case of large gate valves, and the present invention will be found to be particularly useful when applied to such valves.

I have found that operation of valves of the above type may be improved, and maintenance thereof reduced, by providing a sealed-off oil reservoir immediately surrounding the thrust collar or flange of the valve stem. I have also found that such a reservoir may be maintained by providing seals around the valve stems, both inside and outside of said thrust flange or collar.

In providing the above mentioned special reservoir and sealing arrangements, I have found that a great advantage is had in reducing maintenance, if a special type of packing is provided inside the thrust collar and its reservoir, particularly a self-tightening packing which does not require replacement and which does not require any mechanical action to tighten it against the valve stem.

This special type packing is of the O-ring type, wherein pressure within the chamber in which the valve member operates enters the groove in which the O-ring is located and automatically expands it against the valve stem. When employing such a packing or seal inside the thrust flange, the packing used to form the seal around the stem outside the flange may be adjusted or repacked, when desired, without any special provision for setting up the inside packing during the repair operations on the outside packing. The superiority of the present type of self-sealing packing is emphasized when it is considered that in certain prior art valves, it is necessary to remove the bonnet from the valve housing and thus place it entirely out of operation in order to adjust the packings, and furthermore, in certain structures of the prior art, special valve designs are provided so that the valve member itself can be used to temporarily tighten the inside packing while the outside packing is being changed.

It will be obvious from the description below that the difficulties and disadvantages referred to have been avoided by the present invention, and the design of valve shown permits constant lubrication of the thrust collar and effective valve stem packing, all within a minimum of space.

Other objects and advantages of the present invention will be apparent from the following description and the accompanying drawings, in which.

Figure 1:
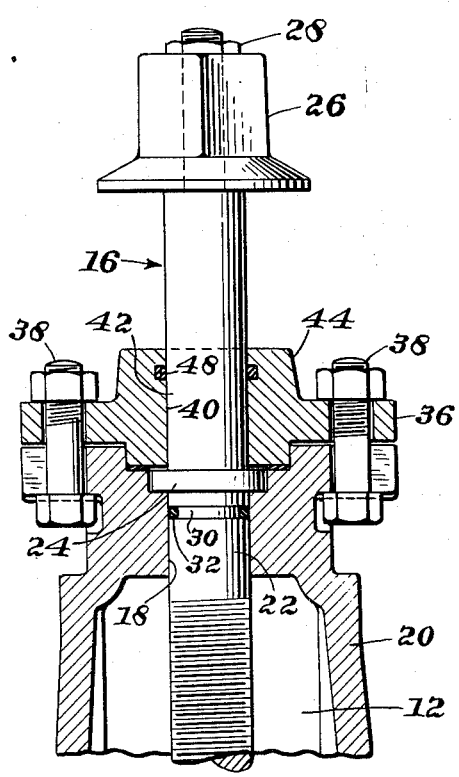
Figure 1 is a fragmentary vertical sectional view through a valve embodying this invention and showing the lubricant reservoir about the valve stem thrust collar and the seals for such reservoir.

Figures 5, 6, 7, and 8 are views corresponding to Figure 1 showing modifications of the invention.

Figure 9 is a vertical sectional view through a removable sleeve or bearing collar in which a pair of O-ring seals are mounted, the sleeve being adapted for use in the modification shown in Figure 6.

It is a common manufacturing practice to place packing above or outside the thrust collar of a valve stem of the non-rising type. It is not customary, however, to place packing inside of this collar, although certain prior art patents do disclose packing in this position. In case of the latter, however, it is necessary to remove the bonnet or other parts in order to adjust the inner packing, or some special mechanical arrangement is required in order to adjust the inner packing without disabling the valve. In valves which are now in use, the lubricant used on the valve stem dissipates in service, either through drainage or by being absorbed by the fluid which moves through the valve chamber. As a result of lubricant dissipation, it becomes very difficult to rotate the valve stem, especially in valves of larger size.

Figure 3:
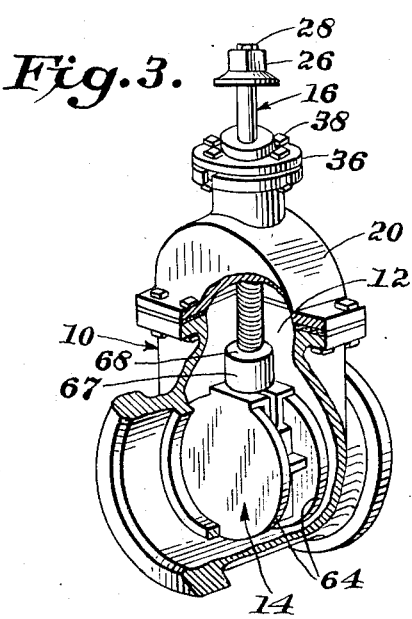
Figure 3 is a perspective view of a type of valve in which the invention may be employed, the valve housing being broken away to show the interior working parts.

Referring to Figures 1 and 3, there is shown a gate valve having a housing 10 forming a valve chamber 12 in which a valve gate 14 slides. Threadedly engaged with the valve gate 14 is a valve stem 16 of the non-rising type, rotation of the stem serving to open and close the valve in a well known manner. The stem 16 extends through a bore 18 in a housing bonnet 20, which bore serves as a bearing for an inner portion 22 of the valve stem. The valve stem 16 has the usual thrust collar 24, and the outer end of the stem beyond the collar has a head 26 held thereon by a nut 28, which head is used to turn the stem to open and close the valve. The stem portion 22 within the bore 18 is provided with an annular groove 30 and in this groove (Figure 4) there is an annular resilient O-ring 32, preferably of rubber or the like. This ring 32 is normally circular in radial section, but may be distorted in its groove 30 by pressure to assume a different shape when forming a tight seal between the valve stem 16 and the wall of the bore 18. The diameter of the ring 32 in radial section is slightly greater than the depth of the groove 30, so that the ring normally bears against the wall of the bore 18 and the bottom wall 34 (Figure 4) of the groove.

Outside of the thrust collar 24 there is a cap 36 removably secured to the bonnet 20 as by bolts 38, although it will be understood that other types of detachable securing means may be used to fasten the cap to the bonnet. The cap 36 has a bore 40 extending therethrough aligned with the bore 18 and receiving the outer portion 42 of the valve stem 16. The cap 36 is extended outwardly as at 44 and adjacent the outer end of this extension the wall of the bore 40 is provided with an annular groove 46 (Figure 4) having an O-ring 48 therein, both similar in proportions to the groove 30 and ring 32 construction.

Figure 4:
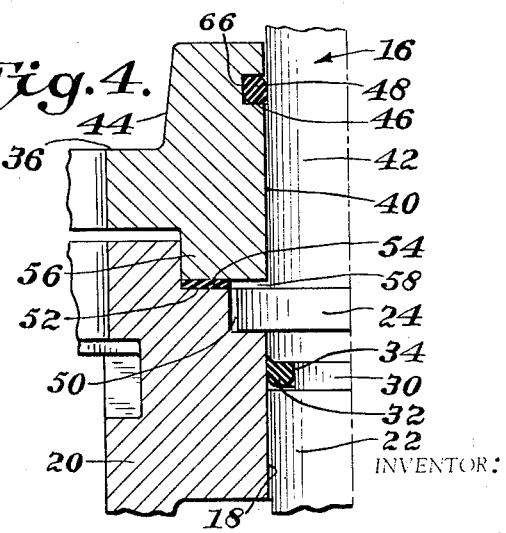
Figure 4 is an enlarged fragmentary view of a portion of Figure 1 to more clearly disclose the lubricant reservoir and the sealing action of the pressure-responsive packing rings.

In the outer surface of the bonnet 20 a distinct lubricant chamber or reservoir 50 is formed around the thrust collar 24, as best shown in Figure 4. At the outer end of the bore 18 the outer face of the bonnet 20 is recessed both to receive the thrust collar 24 and to form the lubricant chamber 50. It will be noted that the peripheral wall of the chamber 50 is spaced sufficiently from the periphery of the thrust collar 24 for ample reception of lubricant therebetween.

Above the lubricant-chamber-forming recess, the bonnet 20 is further cut away to form a ledge 52 for an annular packing strip or gasket 54 (Figure 4), this packing strip being compressed by an extension 56 on the inner face of the cap 36. The dimensions of the parts are such that, when assembled as shown in Figure 1, a distinct space 58 is left between the outer face of the thrust collar 24 and the inner face of the cap 36, such space 58 forming a part of the lubricant reservoir 50 surrounding the thrust collar.

In the embodiment shown in Figure 5, the parts are generally as described above, except that the inner O-ring 60 is located in a groove 62 in the wall of the bore 18, rather than in a groove in the stem 16. Although the O-ring seals of this embodiment have the same sealing effectiveness as those of Figure 1, there are several advantages to placing the inner O-ring in a groove in the stem 16, as shown in Figure 1, rather than in a groove in the wall of the bore 18. First of all, it is far easier to machine an O-ring groove in the valve stem to permissible tolerances than to machine such a groove in the wall of the bore. Secondly, it is easier to assemble the O-ring in a groove in the valve stem 16 and then to insert the valve stem into the bore 18, than to assemble the O-ring in a groove in the wall of the bore and then insert the valve stem into such bore. Moreover, since the stem 16 is removable without disturbing the bonnet 20, it is easier to replace an O-ring in a stem groove than in a groove in the wall of the bore 18.

The formation of an O-ring groove in the valve stem at the inside of the thrust collar does not unduly weaken the stem because the diameter of the base of the groove is very little less than the root diameter of the threaded inner portion of the valve stem. Additionally, the torque imparted to the valve stem by rotating the head is absorbed in large part by frictional losses between the thrust collar and the inner face of the cap or the outer face of the bonnet, so that the torque load on the valve stem inwardly of the thrust collar is not very great.

As previously mentioned, the invention is applicable to any valve having a non-rising type of stem, but particularly to gate valves. Figure 3 shows such a valve gate having a valve member or gate 14 comprising a pair of valve discs 64 which are wedged apart when the valve is closed, but permitted to collapse with respect to one another at the time the gate, which includes the discs, is raised upwardly from its seat, as viewed in Figure 3. A valve of this type is illustrated as it is one requiring considerable force to open either when the valve is of large size or is used to control relatively high pressures.

The action of the O-rings is illustrated in Figure 4. The outer O-ring 48 is normally of such inner diameter as to embrace the valve stem 16 in sealing relation, and of such outer diameter as to contact the bottom wall 66 of the groove 46 in which it is mounted in sealing relation. The inner O-ring 32 is normally of such outside diameter as to contact the wall of the bore 18 in sealing relation and of such inner diameter as to embrace the bottom wall 34 of the groove 30 in sealing relation. When pressure within the valve chamber 12 increases, this pressure flows into the groove 30 at the inner side of the O-ring 32 and forces the latter against the outer side wall of the groove 30, thus deforming the ring to more tightly seal against both the bottom and outer walls of the groove 30 and against the wall of the bore 18. Hence, the inner O-ring 32, in addition to sealing off the lubricant reservoir 50, assures against leakage of pressure fluid from the valve chamber 12 to the thrust collar 24 with the resultant possibility of corrosion thereof. Obviously this packing arrangement is of the pressure-responsive or self-tightening type and requires no special arrangements or adjustments to assure its tightness. Furthermore, this packing arrangement will stand up over a long period of time without replacement or adjustment. In the event that the inner O-ring 32 should fail, the outer O-ring 48 assures against leakage of the fluid controlled by the valve to the exterior thereof.

With the arrangement disclosed, and particularly illustrated in Figure 4, a permanent lubricant reservoir 50 is provided around the thrust collar 24, which reservoir is sealed off by the outer packing ring 48, inner packing ring 32, and by the annular gasket 54. With this arrangement a considerable quantity of grease or oil can be put into the reservoir at the time that the valve is assembled or installed, and it has been found that this lubricant will be maintained available for use over a period of years while at the same time maintaining the packing seals in efficient operating condition.

In partial explanation of these advantageous results, it is believed that during the assembly of the cap onto the bonnet after the lubricant has been put into the reservoir, it is probable that air is trapped in the space between the outer portion 42 of the valve stem above the thrust collar 24 and the wall of the bore 40 inwardly of the outer O-ring 48. When the cap is forced down on the gasket 54, the resulting displacement of lubricant compresses this air which thereafter tends to maintain pressure on the lubricant in the reservoir to thereby aid its lubricating action for the thrust collar. Additionally, it will be seen that by reason of the space 58 between the outer face of the thrust collar 24 and the inner face of the cap 36, the valve stem 16 will move slightly axially during operation thereof to open and close the valve. Such movement further insures adequate lubrication of the thrust collar and also of the O-rings 32 and 48. It also will be observed that unlike prior art valve structures, the packing rings around the valve stem are spaced from the thrust collar and do not contact the same so that rotation of the thrust collar has no detrimental tearing effect upon the packing rings. It also is pointed out that the outer O-ring 48 is located only a short distance inwardly of the outer face of the cap 36 to thus minimize the axial extent of the cylindrical space between the stem 16 and the bore 40 outwardly of the outer packing. The short axial extent of such cylindrical space minimizes the collection of dirt or corrosion in such space.

Figure 2:
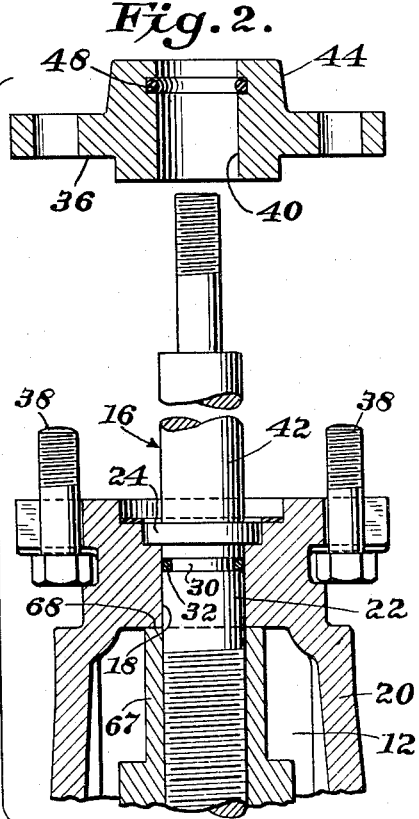
Figure 2 is a view corresponding to Figure 1, but showing certain of the parts exploded in order to illustrate the manner of removing the cap for adjustment or replacement of the packing therein.

Figure 2 illustrates the steps involved in replacing the outer packing without dismantling the valve. In this view the head 26 has been removed from the stem 16 and the bolts 38 released to permit removal of the cap 36 from the bonnet 20. The O-ring 48 within the cap is removed with the latter for ease of adjustment or replacement. While the inner O-ring 32 will hold the pressure in the valve chamber 12 at this time, the nut 67, which is an integral part of the top wedge of the valve gate 14, will have been previously drawn upwardly until its upper flat end 68 engages against a similar flat inwardly presented abutment face on the inner wall of the bonnet 20, whereby the inner face of the thrust collar 24 is tightly sealed against the inner face of the reservoir 50. These respective engaging faces may be appropriately machined to provide a tight metal-to-metal seal when the valve stem 16 is turned so that the nut 67 is moved to its outermost position. It will thus be seen that when the valve is fully opened, the multiple seals thus formed will permit the cap 36 to be removed and a new O-ring 48 inserted therein without any possibility of fluid leakage.

In the embodiment shown in Figure 6, the bonnet 20 is interiorly threaded at its outer end for the removable reception of an exteriorly threaded inner bearing sleeve or collar 70 which has a bore 72 provided with a groove 74 and an O-ring 76, similar to the embodiment shown in Figure 5. An annular flat packing gasket 78 is interposed between the outer end of the bearing collar 70 and an abutment ledge 80 formed in the bonnet 20. The cap 36 is likewise threaded to removably receive a complementary threaded bearing collar 82, the lower end of the bore of this collar being counterbored to provide an annular groove 84 for an O-ring 86, the lower end of this groove being open, and the lower end of the bearing collar 82 engaging a gasket 88 which rests on a ledge 90 formed in the cap.

In this construction, it will be understood that when the stem 16 is turned to move the valve member to its fully closed position, further turning of the valve stem will cause an outward thrust to be exerted on the valve stem, whereby the outer face of the thrust collar 24 will be tightly sealed against the inner face of the cap 36, as shown in Figure 6. Preferably, these engaging faces are suitably machined to provide tight sealing contact with one another, this contact, together with the seal provided by the inner O-ring 76, doubly insuring against fluid leakage from the valve chamber 12 when the bearing collar 82 is being removed to replace the O-ring 86 or the gasket 88.

In the modification shown in Figure 7, there is shown an outer removable bearing collar 92 substantially the same as that shown in Figure 6, save that the annular groove 94 in such collar is spaced substantially centrally along the bore thereof. Additionally, the lower O-ring groove 30 is formed in the valve stem 16 for contact with a bore 18 formed in an integral portion of the bonnet 20, substantially the same as the construction shown in Figure 1. In this embodiment, the bearing collar 92 may be removed to change the packing in the same manner as described above for the embodiment shown in Figure 6.

In Figure 8 the outer O-ring and groove are formed in a bearing collar 82 like that shown in Figure 6 whereas the inner seal is provided with double packing means consisting of a pair of axially spaced grooves 30 in the valve stem having O-rings 32 therein.

In Figure 9 there is disclosed a removable inner bearing collar 96 for substitution for the inner bearing collar 70 shown in Figure 6. This bearing collar 96 has a pair of axially spaced O-ring receiving grooves 74 formed in its bore 72 and with O-rings 76 therein, with the attendant advantages of spaced O-ring packing.

It will be realized that various changes may be made in the specific embodiments illustrated and described for the purpose of disclosing the principles of this invention without departing from such principles. Therefore, this invention includes all modifications which are encompassed by the spirit and scope of the following claims.

I claim:

1. In a valve having a housing forming a valve chamber, a reciprocating valve member therewithin, and a rotary valve stem of the non-rising type for operating the valve member to open and close the valve, the combination comprising: means defining a bore through the wall of the housing to receive and form a bearing for the stem; a thrust collar on the stem where the latter passes through said bore, said bore being enlarged to receive said collar and to provide additional space therearound constituting a closed lubricant reservoir, the axial length of said reservoir being somewhat greater than the thickness of said collar to permit limited axial movement of the stem; means defining circumferential grooves between said stem and said bore on opposite sides of said collar; and annular resilient packing rings, normally circular in radial section, disposed in said grooves to seal said reservoir, the groove disposed inwardly of said collar being formed in the valve stem and the groove disposed outwardly of said collar being formed in the wall of said bore.

2. In a valve having a housing forming a valve chamber, a reciprocating valve member therewithin, and a rotary valve stem of the non-rising type for operating the valve member to open and close the valve, the combination comprising: a thrust collar on the stem between the ends thereof; means defining a bore through the wall of the housing to receive the stem and provide a bearing therefor, said bore being enlarged at its outer end to receive said collar and to provide a lubricant reservoir therearound; a cap secured to the housing to close the outer side of said reservoir beyond the outer face of said collar; means defining a corresponding bore through said cap in alignment with said housing bore and for reception of the stem, said cap being spaced from the inner side of said reservoir a distance somewhat greater than the thickness of said collar to permit limited axial movement of the stem; and sealing means for said reservoir comprising means defining circumferential grooves between the stem and said bores on opposite sides of said collar and annular resilient packing rings, normally circular in radial section in said grooves, the groove disposed inwardly of said collar being formed in the stem and the groove disposed outwardly of said collar being formed in the wall of said cap bore.

3. In a valve having a housing forming a valve chamber, a reciprocating valve member therewithin, and a rotary valve stem of the non-rising type for operating the valve member to open and close the valve, the combination comprising: means defining a bore through the housing wall to receive and form a bearing for the stem; a thrust collar on the stem where the latter passes through said bore, said bore being formed to provide a lubricant reservoir extending around the periphery of said collar and of greater axial dimension than said collar to permit limited axial movement of the stem; means defining an annular groove in that portion of the valve stem disposed in said bore inwardly of said collar and said reservoir; and an annular resilient ring in said groove, said ring being substantially circular in radial section and of greater diameter in radial section than the depth of said groove, said groove being of greater area in radial section than the corresponding area of said ring to permit fluid under pressure from within the valve chamber to force said ring outwardly against the wall of said bore and against the outer side wall of said groove to seal therewith.

4. The structure defined in claim 3 including means defining an annular groove in the wall of the bore outwardly of the collar and the reservoir; and an annular resilient O-ring in said groove to form a seal between said wall and the stem.

References Cited in the file of this patent

UNITED STATES PATENTS

| | | |
|---|---|---|
| 494,581 | Lunkenheimer | Apr. 4, 1893 |
| 1,656,555 | Brooks | Jan. 17, 1928 |
| 2,011,087 | Sherman | Aug. 13, 1935 |
| 2,394,364 | Christensen | Feb. 5, 1946 |
| 2,401,377 | Smith | June 4, 1946 |
| 2,427,439 | Brown | Sept. 26, 1947 |
| 2,511,477 | Mueller | June 13, 1950 |
| 2,524,142 | Seeloff | Oct. 3, 1950 |

FOREIGN PATENTS

| | | |
|---|---|---|
| 24,625 | Great Britain | of 1895 |